US012698647B2

(12) United States Patent
Morstatt et al.

(10) Patent No.: US 12,698,647 B2
(45) Date of Patent: Aug. 4, 2026

(54) ELECTRONIC LOCKING DEVICE

(71) Applicant: ASSA ABLOY Access and Egress Hardware Group, Inc., New Haven, CT (US)

(72) Inventors: Scott Morstatt, Maryville, TN (US); Andrew Wilding, Bristol, CT (US); William Gardiner, New Haven, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 278 days.

(21) Appl. No.: 17/493,127

(22) Filed: Oct. 4, 2021

(65) Prior Publication Data

US 2022/0106814 A1 Apr. 7, 2022

Related U.S. Application Data

(60) Provisional application No. 63/088,248, filed on Oct. 6, 2020.

(51) Int. Cl.
*E05B 41/00* (2006.01)
*E05B 17/10* (2006.01)

(52) U.S. Cl.
CPC .............. *E05B 41/00* (2013.01); *E05B 17/10* (2013.01)

(58) Field of Classification Search
CPC ............................... E05B 17/10; E05B 17/106
See application file for complete search history.

(56) References Cited

U.S. PATENT DOCUMENTS 4,777,570 A * 10/1988 Littles ..................... E05B 17/10 362/100
5,057,975 A * 10/1991 Evigan .................... E05B 17/10 362/100

(Continued)

FOREIGN PATENT DOCUMENTS

AU 2019202691 A1 11/2019
CA 117845 S 7/2007

(Continued)

OTHER PUBLICATIONS

International Search Report and Written Opinion for International Application No. PCT/US2021/053347, mailed Jan. 18, 2022.

(Continued)

*Primary Examiner* — Alyson M Merlino
(74) *Attorney, Agent, or Firm* — Wolf, Greenfield & Sacks, P.C.

(57) ABSTRACT

Embodiments disclosed herein relate to electronic locking devices. The locking device may include a housing and an escutcheon attached to the housing. The escutcheon has a body defining an outer perimeter and a light ring disposed around the outer perimeter of the body. The light ring is configured to emit a changeable pattern of light in response to a status event to indicate the status of the electronic locking device. The light ring may be viewable from a front view and a side view. The locking device may be part of a lock set that includes a second locking device. The second locking device has a light pad that may be configured to emit complementary light patterns in response to the status event. The second or interior locking device may have a mode setting button. A controller is configured to receive a mode change from the mode setting button and configured to cause the light ring to illuminate a corresponding mode indication based on the mode change.

14 Claims, 19 Drawing Sheets

(56) References Cited

U.S. PATENT DOCUMENTS

D365,976 S 1/1996 Chiu
5,608,298 A * 3/1997 Frolov ................ E05B 47/0012 70/277
6,107,934 A * 8/2000 Andreou .................. G07C 9/28 398/1
6,420,970 B1 * 7/2002 Kampmann ............ E05B 45/06 340/545.7
D494,841 S 8/2004 Moon et al.
D502,859 S 3/2005 Peng et al.
6,876,293 B2 * 4/2005 Frolov .................... E05B 47/00 340/542
7,108,387 B1 * 9/2006 Lucas ..................... E05B 17/10 362/802
D545,662 S 7/2007 Lu
7,248,163 B2 * 7/2007 Wu ......................... E05B 41/00 340/815.45
7,374,084 B2 * 5/2008 Mitchell ................. E05B 17/10 235/382
D607,303 S 1/2010 Kim et al.
7,819,442 B2 * 10/2010 Leda ....................... E05B 41/00 292/336.3
D666,074 S 8/2012 Genord et al.
D682,659 S 5/2013 Genord et al.
8,633,829 B2 * 1/2014 Cavanaugh ............. E05B 39/00 340/5.55
9,024,759 B2 * 5/2015 Uyeda ..................... E05B 17/10 340/542
D733,522 S 7/2015 Kim et al.
D738,192 S 9/2015 Hetfield et al.
D755,605 S 5/2016 Kraus et al.
9,443,364 B2 * 9/2016 Snider ................ G07C 9/00174
D768,463 S 10/2016 Kraus et al.
9,562,370 B2 * 2/2017 Ohl ..................... E05B 47/0001
D783,384 S 4/2017 Shargh
D790,319 S 6/2017 Schneider
D790,948 S 7/2017 Lai
D790,950 S 7/2017 Kraus et al.
D790,956 S 7/2017 Hetfield et al.
D812,448 S 3/2018 Schneider
D814,265 S 4/2018 Kasper
D817,148 S 5/2018 Carpintero et al.
D818,345 S 5/2018 Morstatt et al.
D818,795 S 5/2018 Morstatt
D818,797 S 5/2018 Morstatt et al.
D833,255 S 11/2018 Lee
D835,970 S 12/2018 Morstatt et al.
10,151,122 B2 * 12/2018 Marks ..................... E05B 17/10
10,161,162 B2 12/2018 Schaeffer et al.
D837,029 S 1/2019 Cavanna et al.
D840,785 S 2/2019 Kasper
10,208,508 B2 * 2/2019 Tien .................... E05B 63/0056
10,240,363 B2 * 3/2019 Hsu ......................... E05B 17/10
D844,411 S 4/2019 Griswold
D844,414 S 4/2019 Leites et al.
10,352,512 B1 * 7/2019 Smith ..................... E05B 17/10
D866,291 S 11/2019 Morstatt et al.
D867,104 S 11/2019 Morstatt et al.
10,494,836 B2 * 12/2019 Voelker ................... E05B 17/10
10,519,694 B2 * 12/2019 Lin ......................... E05B 17/10
10,544,603 B1 * 1/2020 Harripersaud ........ E05B 17/106
10,570,642 B2 * 2/2020 Ramsauer ............... E05B 17/10
D887,248 S 6/2020 Laurans et al.
D888,534 S 6/2020 Kim
D888,536 S 6/2020 Boomer et al.
D891,223 S 7/2020 Ronge
D892,594 S 8/2020 Ronge
10,808,420 B2 10/2020 Morstatt et al.
D906,086 S 12/2020 Qinggui
D911,147 S 2/2021 Li
D916,131 S * 4/2021 Crandall ...................... D14/492
D916,578 S 4/2021 Su et al.
D923,453 S 6/2021 Chen
D936,454 S 11/2021 Guo
D938,799 S 12/2021 Wei
D939,922 S 1/2022 Xin et al.
11,220,844 B2 * 1/2022 Imanuel .................. E05B 17/10
11,363,698 B2 * 6/2022 Brown .................... E05B 17/10
D966,070 S * 10/2022 Palmieri ........................ D8/331
D966,071 S * 10/2022 Palmieri ........................ D8/331
D966,072 S 10/2022 Palmieri et al.
D966,073 S * 10/2022 Palmieri ........................ D8/331
D967,126 S * 10/2022 Luther ......................... D14/485
D981,206 S * 3/2023 Palmieri ........................ D8/331
2004/0090327 A1 5/2004 Soloway et al.
2004/0183652 A1 * 9/2004 Deng .................. E05B 47/0676 70/277
2005/0248931 A1 * 11/2005 Alvarez .................. E05B 17/10 362/276
2006/0114099 A1 * 6/2006 Deng ................. G07C 9/00563 70/277
2006/0144103 A1 * 7/2006 Blanch .................... E05B 41/00 70/330
2006/0227000 A1 * 10/2006 Wu ......................... E05B 41/00 340/686.1
2009/0180277 A1 * 7/2009 Falce ...................... E05B 17/10 362/100
2010/0219957 A1 * 9/2010 Jolley ..................... E05B 17/10 362/100
2010/0307206 A1 * 12/2010 Taylor ................ G07C 9/00309 70/91
2014/0375422 A1 12/2014 Huber et al.
2016/0353542 A1 * 12/2016 Orr ......................... E05B 17/10
2018/0119449 A1 5/2018 Morstatt et al.
2018/0283044 A1 10/2018 Morstatt
2019/0368228 A1 12/2019 Lin et al.

FOREIGN PATENT DOCUMENTS

EM 002109546-0002 S 1/2013
EM 002523365-0003 S 8/2014
EM 002657239-0001 S 6/2017
EM 004372241-0002 S 11/2017
EM 005092004-0001 S 4/2018
EM 005262953-0001 S 5/2018
EM 005978020-0001 S 1/2019
EM 006068532-0004 S 2/2019
EM 008037816-0001 S 8/2020

OTHER PUBLICATIONS

[No Author Listed] Fingerprint Smart Lock Lever Door Handle, hombill 5-in-I Keyless Entry Keypad Door Lock, Smart Locks for Front Door, Biometric Door Lock with Lever, Reversible Handle Passcodes Free App IC Cards. Amazon.com. https://www.amazon.com/Fingerprint-hombill-Biometric-Reversible-Passcodes/dp/B093VP8ZNF/ref=sr_1_17crid=18FQDFGB9YV39&keywords=ASIN%3A%2BB093VP8ZNF&qid=1651780426&sprefix=asin%2Bb093vp8znf%2Caps%2C74&sr=8-1&th=1. ASIN: B093 VP8ZNF. Date first available Nov. 23, 2019; downloaded May 5, 2022. 12 pages.

[No Author Listed] igloohome Smart Deadbolt 2S Installation & Pairing Guide. YouTube. https://www.youtube.com/watch?v=PHZkBdq3_WY. Uploaded Jul. 19, 2018; accessed May 21, 2022. 1 page.

[No Author Listed] Samsung Digital Door Rim Lock SHS-1321 EX + 4 KeyTags—English Manual. eBay. https://www.ebay.com/itm/232398887409?hash=item361c0d99f1:g:YC8AAOSwENdgcBUa. eBay item No. 232398887409. Date first available unknown; last updated Apr. 8, 2022; downloaded May 5, 2022.

[No Author Listed] Sifely Keyless Entry Door Lock, Keypad Door Lock, Keyless Door Lock, Fingerprint Door Lock, Biometrie Door Lock, Keypad Entry Door Lock, Passcode Code Door Lock, Digital Smart Door Lock (Smart Lock). Amazon.com. https://www.amazon.com/Sifely-Lock-Fingerprint-Biometric-Smart/dp/B07Y5V15SY/ref=sr_1_1?crid=X36G1MLJGFWG&keywords=ASIN%3A+B07Y5V15SY&qid=1651780701&sprefix=asin+b07y5v15sy%2Caps%2C72&sr=8-1. ASIN: B07Y5V15SY. Date first available Sep. 20, 2019; downloaded May 5, 2022. 12 pages.

(56) References Cited

OTHER PUBLICATIONS

[No Author Listed] Ultraloq Lever, WiFi Smart Lock with Bridge, Heavy Duty 5-in-1 Keyless Entry Door Locks, Fingerprint Lock with Keypads and Voice Guide, Smart Door Lock for Front Door, Home and Office. Amazon.com. https://www.amazon.com/ULTRALOQ-Bluetooth-Fingerprint-Reversible-Assistant/dp/B086196QJG/ref=sr_1_1?crid=75FBMP2RS6T&&keywords=ASIN%3A%2BB086196QJG&gid=1651781070&sprefix=asin%2Bb086196qig%2Caps%2C73&sr=8-1&th=1. ASIN: B086196QJG. Date first available Mar. 17, 2020; downloaded May 5, 2022. 9 pages.
[No Author Listed] Yale Assure Lock Touchscreen. Amazon.com, https://www.amazon.com/Yale-Assure-Connected-August-Kincaid/dp/B07Q8ND7D7. Date first available May 1, 2019; downloaded Dec. 22, 2022. 6 pages.
International Preliminary Report on Patentability for International Application No. PCT/US2021/053347, mailed Apr. 20, 2023.

* cited by examiner

ELECTRONIC LOCKING DEVICE

RELATED APPLICATION

This application claims the benefit under 35 U.S.C. § 119(e) of U.S. Provisional Application No. 63/088,248, filed Oct. 6, 2020, which is hereby incorporated by reference in its entirety.

FIELD

Disclosed embodiments are related to electronic locking devices and related methods of use.

BACKGROUND

Door locks are used to secure entryways. Electronic door locks allow a user to present a credential to cause the door to unlock, allowing entry. The electronic door locks may have an actuator that automatically retracts a latch or deadbolt or may simply allow a door handle to be manually actuated upon authenticating a credential.

SUMMARY

In accordance with some embodiments, an electronic locking device may communicate to a user a status event, such as when a person is allowed or denied entry through a doorway after presenting a credential.

In some embodiments, an electronic locking device includes a housing and an escutcheon attached to the housing. The escutcheon has a body defining an outer perimeter and a light ring disposed around the outer perimeter of the body. The light ring is configured to emit a changeable pattern of light in response to a status event to indicate the status of the electronic locking device. The light ring is viewable from a front view and a side view.

In some embodiments, an electronic lock set includes a first locking device and a second locking device. The First locking device has a first housing, a first escutcheon attached to the first housing and a light ring positioned on the first escutcheon. The second locking device has a second housing and a second escutcheon attached to the second housing. The second locking device is configured to communicate with the first locking device. The second locking device has a light pad positioned on the second escutcheon. The light ring and the light pad are configured to emit complementary light patterns in response to a status event.

In some embodiments, an electronic lock set includes an exterior locking device and an interior locking device. The exterior locking device includes an exterior housing, an exterior escutcheon attached to the exterior housing and a light ring disposed around a perimeter of the outer escutcheon. The exterior locking device is configured to be mounted to an exterior region of an entrance. The interior locking device has an interior housing, an interior escutcheon attached to the interior housing and a mode setting button. The interior locking device is configured to be mounted to an interior of the entrance. A controller cooperates with the exterior and interior locking devices. The controller is configured to receive a mode change from the mode setting button and configured to cause the light ring to illuminate a corresponding mode indication based on the mode change.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
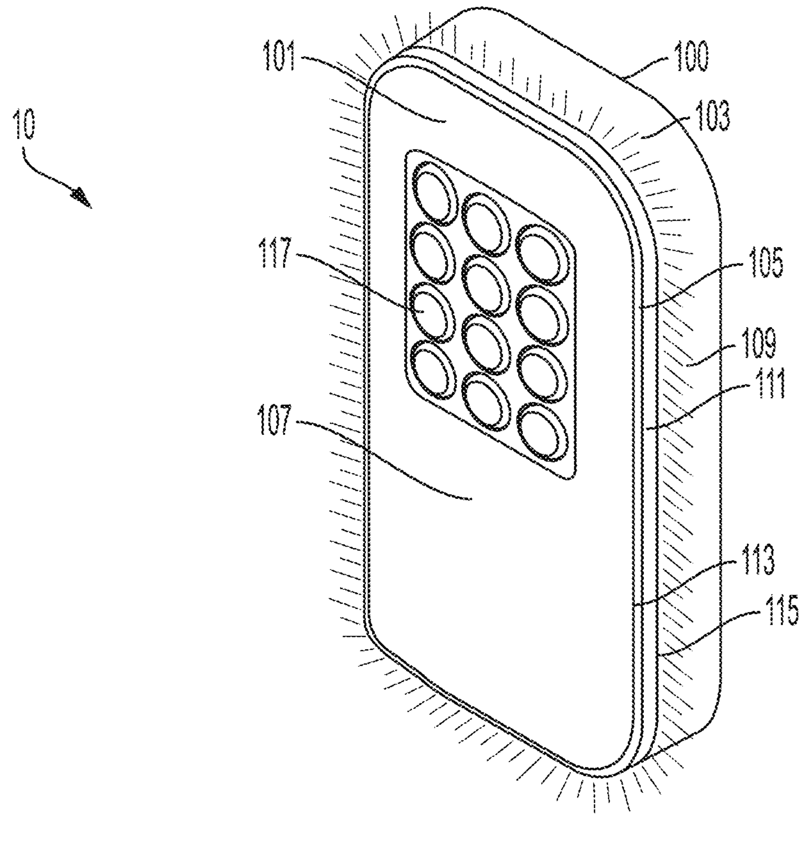
FIG. 1 is a front, perspective view of one embodiment of an electronic locking device.

The inventors have recognized and appreciated designs for an electronic locking device that serves as an interface between a user and a variety of devices within a larger electronic locking system. In accordance with some embodiments, the electronic locking device may communicate to a user a status event, such as when a person is allowed or denied entry through a doorway after presenting a credential (e.g., an access code, an RFID card, a fingerprint or other biometric identifier, a smartphone, etc.). In some embodiments, the electronic locking device may send a signal to other electronic devices to perform an action once a credential is authenticated and authorized. For example, when a person wants to enter a room through a doorway, the person may enter a code into an electronic locking device located on or near the exterior side of the door. If the code is authenticated and authorized to open the door, the electronic locking device may send a signal to a latch device within the door to allow a door handle to be retracted so that the person may enter. Of course, it should be appreciated that the electronic locking device might include a motorized door latch such that upon presentation of the user's credentials, the door lock automatically retracts a latch or a deadbolt. It should also be appreciated that the electronic locking device may actuate a different type of door retention apparatus. For example, the door may be held in a closed and locked state with an electromagnet. Upon presenting a valid credential, the electromagnet may be energized or deenergized, as the case may be, in order to allow the door or other access to be opened. Furthermore, the electronic locking device may communicate with a door actuator such that upon presentation of a valid credential, the door actuator automatically opens the door. In one embodiment the door actuator may operate a conventional swinging/hinged door, or may actuate an overhead door such as a garage door.

The inventors have further recognized and appreciated designs for an electronic locking device that communicates a status event (e.g., low battery, access allowed, access rejected, configuration failure) to a user by providing a visual presentation from many vantage points. In some embodiments, the electronic locking device includes a housing and an escutcheon mounted to the housing. The escutcheon may include a body and a light assembly disposed on the body. The light assembly may be configured to emit a pattern of light in response to the status event and depending on the type of status. That is, the light assembly may emit one pattern of light for one type of status and a different pattern of light for different type of status.

In accordance with some embodiments, the light assembly may be positioned on the escutcheon body such that a user may be able to effectively view the pattern of light from a front view and from multiple side views. Accordingly, for example, the electronic locking device is configured to indicate a locked or unlocked status to users who might not be head-on with the locking device. In this regard, the lock status may be presented to a user who might be viewing the locking device from the side of the locking device. In some embodiments, the light assembly includes of a light ring disposed around an outer perimeter of the body of the electronic locking device. The light ring may extend around the entire outer perimeter of the body forming a complete ring. The light ring may extend from the outer perimeter onto a front face of the body and from the outer perimeter onto a sidewall of the body, making up at least a partial surface of the front face and a sidewall. In this way, as noted above, the lock status may be viewable from multiple different angles. The light ring may be integrated with the body such that the surface of the light ring is flush with the front face and the sidewalls of the body.

In accordance with some embodiments, the light ring may include a plurality of light emitting diodes divided into at least two light sections, each light section configured to emit various colors of light at different time intervals to create a unique pattern of light. Each unique pattern of light may represent a specific status event. In some embodiments, the light ring may have eight light sections: four corner light sections and four straight light sections between the corner sections. To represent a status event, the corner light sections and the straight light sections may, for example, alternatingly emit a red light to create a flashing red display. To represent another status event, the light sections may, for example, consecutively emit a blue light to resemble the light moving around the perimeter of the escutcheon body. The light patterns may be static or animated and may vary in intensity.

Using various colors of light and timing sequences to create different patterns of light, the light ring may be configured to communicate many different status events to the user.

In some embodiments, after the electronic locking device has authorized a credential to allow access through a doorway, the light ring may emit a unique pattern of light (e.g., a cascading blue light) to communicate to the user that access was approved and that the user may now enter. In one embodiment, this is accomplished by the electronic locking device enabling the user to operate a door handle to retract the door latch. Alternatively, if the electronic locking device has determined that the credential is not authenticated or not authorized to access the doorway, then the light ring may emit a unique pattern of light (e.g., alternating light sections emitting a red light) to communicate to the user that access was rejected and the entryway will remain locked.

In another example, a person may enter a credential into an electronic locking device located near a garage in an attempt to open a garage door. If the electronic locking device determines that the credential is authenticated and authorized to open the garage door, then the light assembly may emit a unique pattern of light to communicate to the user that access was approved. The electronic locking device may also simultaneously send a signal to a garage door opener to open the garage door.

In accordance with some embodiments, the electronic locking device may include a sound device configured to play a sound in response to a status event. For example, if the electronic locking device has approved access, the sound device may play a "happy" sound. Alternatively, if the electronic locking device has rejected access, the sound device may play a "sad" sound. The sound device may be configured to play a sound as the light ring emits a pattern of light, providing a coordinated visual and auditory presentation to the user in response to the status event.

The inventors have further recognized and appreciated designs for an electronic lock set that communicates a status event on multiple devices simultaneously. In some embodiments, the electronic lock set includes an exterior locking device and an interior locking device that communicate with each other. The exterior locking device may be located exterior to an entrance and the interior locking device may be located interior to an entrance. Each locking device may include an escutcheon attached to a housing. In some embodiments, each escutcheon includes a light assembly configured to emit complementary patterns of light in response to the status event. The inventors have recognized that users located on both the exterior and the interior side of an entrance may be interested in receiving a status event notification. Electronic lock sets as disclosed herein may communicate the status event to any person within view of the exterior locking device and the interior locking device.

For example, a person attempting to access the entrance of a dwelling may present a credential to the exterior locking device of the electronic lock set. If the credential is not authorized, the light assembly of the exterior locking device may emit a pattern of light to communicate a status event (e.g., access rejected) to the person attempting to access the entrance, as noted above. At the same time, the light assembly of the interior locking device may emit a similar pattern of light to communicate the same status event. As such, the electronic lock set may provide a status event to anyone in view of the interior locking device, notifying them that a person outside is attempting to gain access. Such notification may be an indication that the credentials were rejected.

In accordance with some embodiments, the exterior locking device, for example, may be the electronic locking device described above, and include a light ring on the exterior escutcheon body that is configured to emit a unique pattern of light in response to a specific status event. The interior locking device may include a light pad on the interior escutcheon body that has one or more light emitting diodes capable of emitting one or more various colors of light at different time intervals. The light may be static or animated and may vary in intensity. The light pad may be configured to emit a pattern of light that complements the pattern of light emitted by the light ring on the exterior escutcheon in response to the status event. For example, if the light ring on the exterior escutcheon emits a pattern of light of alternating red and blue light to communicate a status event, the light pad on the interior escutcheon may emit a complementary pattern of light of alternating red and blue light to communicate that same status event.

In some embodiments, the exterior locking device may be mounted on an exterior side of a door and the interior locking device may be mounted on an interior side of the door. If a person attempts to open the door by presenting a credential, the light ring and the light pad may emit complementary patterns of light in response to a status event (e.g., access allowed or access denied) to notify a person on either side of the door of the status event. In some embodiments, the exterior locking device may include a handle that the user may operate to allow a latch (or deadbolt depending on the type of door lock) to retract when access has been allowed to enter the doorway. As noted above, the electronic locking device might include a motorized door latch or motorized deadbolt such that upon presentation of the user's credentials, the door lock automatically retracts latch or deadbolt.

In some embodiments, the exterior locking device may be mounted near an exterior region of a garage door and the interior locking device may be mounted inside the garage. The interior locking device may also be mounted inside a home connected to the garage, such as in a kitchen, mudroom, hallway, etc. In some embodiments, the interior locking device may be mounted in a separate location or may be transportable (i.e., the interior locking device may be an app on a smart phone that simulates a light pad that emits a pattern of light). If a person attempts to open the garage door by presenting a credential to the exterior locking device, the light ring on the exterior escutcheon body and the light pad on the interior escutcheon may display a complementary pattern of light to communicate the specific event status (e.g., access allowed, access rejected) to the person trying to access the garage as well as anyone in view of the interior locking device.

The inventors have further recognized and appreciated designs for an electronic lock set that allows users to enable a privacy mode setting that rejects access to all unauthorized and authorized credentials. The inventors recognize that there may be times when a user wishes to prevent any person from accessing an entrance; this may include people with authorized credentials who are otherwise allowed to enter when the privacy mode is not enabled.

In accordance with some embodiments, a user may enable a privacy mode setting on the electronic lock set by pressing a privacy button on the interior locking device. In some embodiments, the privacy button may include a light assembly and also serve as the light pad on the interior escutcheon.

In accordance with some embodiments, when the privacy mode is enabled, a person may present an authorized credential to the exterior locking device to enter a doorway. In response, the exterior light ring may emit a "privacy active" pattern of light to notify the person of the privacy mode status event. Alternatively, the light ring may emit an "access rejected" pattern of light in response to a person who has presented an unauthorized credential, regardless of whether the privacy mode is enabled or disabled at the time. In all cases, the doorway may remain locked and the person will be unable to enter, although the person with an authorized credential may be notified that access was denied because the privacy mode was enabled, not because the credentials were invalid.

The inventors have further recognized and appreciated designs for an electronic lock set that safeguards against users inadvertently locking themselves out of a doorway when the privacy mode is enabled. In some embodiments, an administrator may be defined to have authorized credentials to override a privacy mode setting.

In some embodiments, the privacy mode may be automatically disabled when a user opens the doorway from the inside. For example, a user may activate the privacy mode while inside a home. The user may forget that the privacy mode is enabled when the user leaves the home hours later. When the user opens the door to leave, the electronic lock set may automatically shut off the privacy mode such that the user will not be locked out when the user returns home.

In accordance with some embodiments, the electronic lock set may include a mechanical key override. By inserting a mechanical key into a key access slot disposed in the exterior locking device, a user may cancel any status event or mode setting programmed into the electronic lock set, including a privacy mode setting, allowing the user to enter the doorway. The mechanical key may also allow a person to enter in the event the batteries in the exterior locking device are too low on power. Using a mechanical key to override the electronic lock set differs from a person trying to enter a door by forced entry, and the electronic lock set may record the status event as a mechanical key override rather than a forced entry.

In some embodiments, the electronic locking device may communicate with a central server such that the status of the lock may be communicated to the central server. In this way, a building custodian or administrator may be informed of the attempted access.

According to exemplary embodiments described herein, the electronic locking device may include one or more processors configured to coordinate one or more functions of the electronic locking device. The processor(s) may be configured to execute one or more sets of computer-executable instructions stored on computer-readable storage onboard the electronic locking device. The storage may be implemented as one or more volatile and/or non-volatile storages, such as non-volatile memory. The processor(s) may be configured to receive information from one or more sensors of the electronic locking device, including signals from a number keypad, scanner, or a magnetic encoder of the electronic locking device. The processor(s) may also be configured to command one or more actuators of the electronic locking device. For example, the processor(s) may command an actuator (e.g., a motor or solenoid) to automatically move a driveshaft (or blocking pin) of the electronic locking device. The processor(s) may also be configured to communicate with one or more other devices. For example, the processor(s) may control one or more wireless transmitters of the electronic locking device to send or receive information/commands to or from a remote device and/or central server, respectively. The electronic locking device may include a power source configured to supply electrical power to the processor(s) and associated components. In some embodiments, the power source may be one or more batteries.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of the electronic locking device in accordance with some embodiments. In the illustrated embodiment, the electronic locking device 10 includes a housing 100 to which an escutcheon 101 is attached. The escutcheon 101 may include a body 103 and a light ring 111 disposed on the body. The body 103 may be rectangular in shape with rounded corners, though other shapes are contemplated. The body 103 may include a front face 107 and sidewalls 109.

In accordance with some embodiments, the light ring 111 may be configured to emit a pattern of light in response to a status event (e.g., access allowed, privacy active, configuration in progress, passage enabled) into indicate the status of the electronic locking device. The light ring may include a plurality of light emitting diodes (LEDs, not shown) divided into at least two light sections that may emit various colors of light at different times to create unique patterns of light. The pattern of light may be static or animated and may vary in intensity. Each unique pattern of light may represent a specific status event. It will be appreciated that the LEDs may be attached to a printed circuit board (not shown) communicating with a controller. In one embodiment, the light ring is a transparent component covering the LEDs.

In some embodiments, the light ring 111 may be disposed on the body 103 such that it is viewable from multiple vantage points. The light ring 111 may be positioned around an outer perimeter 105 of the body 103. The light ring 111 may extend at least partially around the outer perimeter 105 (e.g., may have an angular extent of at least 45, 90, 135, or 180 degrees) or it may extend around the entire outer perimeter 105 forming a complete ring. The light ring 111 may be integrated in the body 103 such that the surface of the light ring is flush with the surface of the front face 107 and the sidewalls 109. The light ring 111 may extend from a perimeter 113 of the front face to an adjacent perimeter 115 of the sidewall, forming at least a partial surface of the front face and at least a partial surface of the sidewall. As such, a person may be able to view the light ring and the pattern of light from a front view and a side view.

The light ring may be formed as a transparent member, such as transparent plastic component, that overlies the plurality of LEDs. The escutcheon body may also be formed of plastic. In this manner, the transparent light ring may be formed integral with the body through a coinjection process or other suitable manufacturing process, as the present disclosure is not limited in this regard. Alternatively, the light ring may be formed of a transparent material that is attached to the escutcheon body via a suitable attachment arrangement.

In accordance with some embodiments, the locking device 10 may include at least one input device for a user to present a credential. For example, in the illustrated embodiment, the locking device 10 includes a number keypad 117 for a user to enter in an access code. In some embodiments, the locking device 10 may include a scanner for a user to scan in an access code (e.g., using an RFID card, fingerprint or other biometric identifier, smartphone, etc.). The locking device 10 may comprise one or more input devices. The keypad 117 may illuminate upon any keypress or if an access card is within a readable range.

Figure 2:
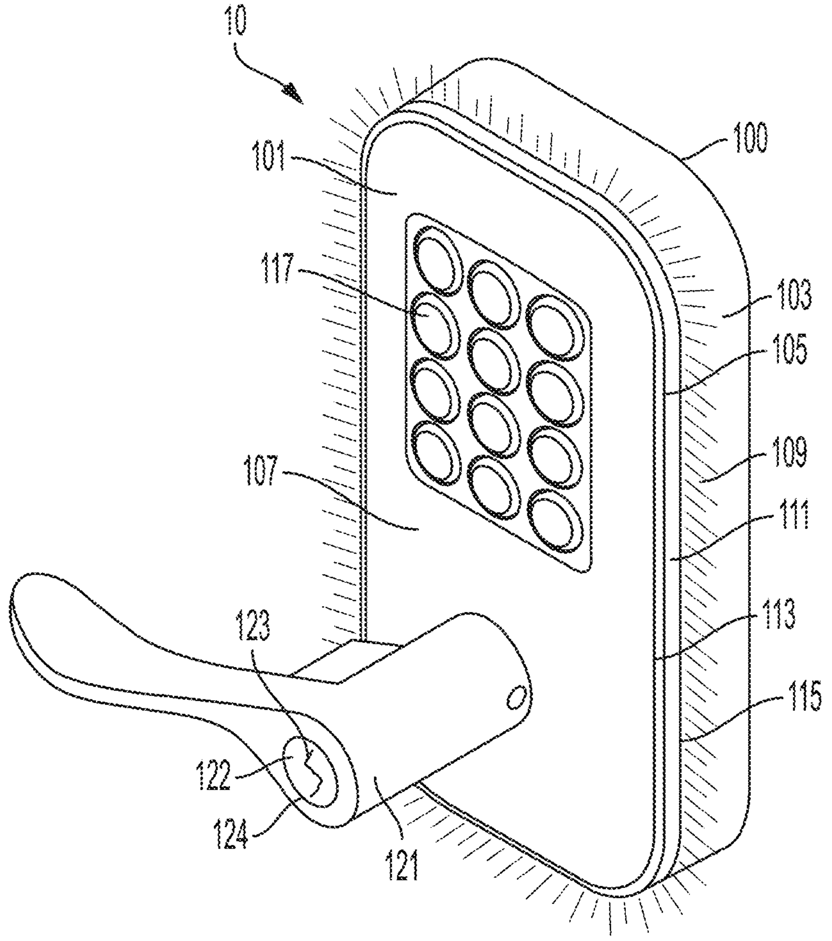
FIG. 2 is a is a front, perspective view of another embodiment of the electronic locking device.
Figure 5:
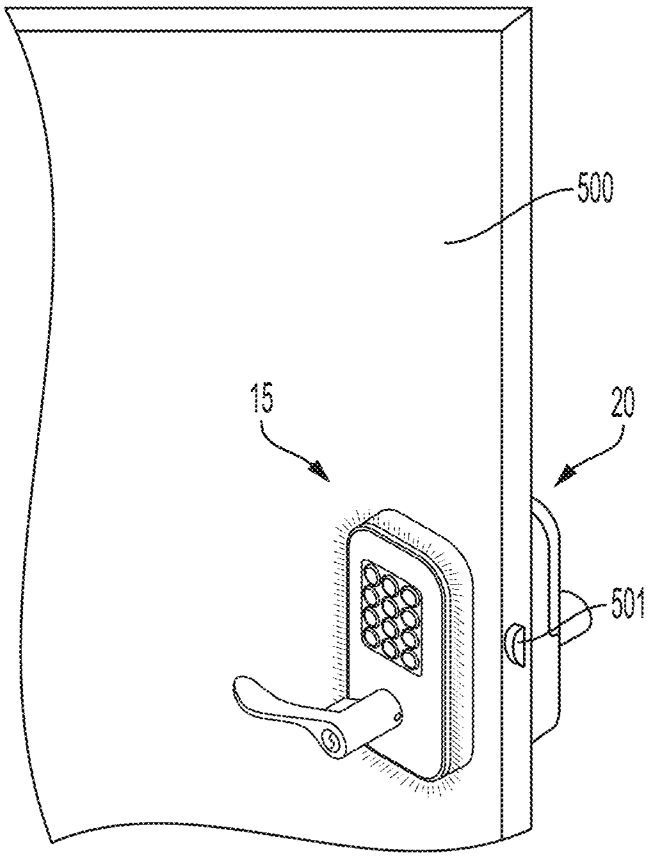
FIG. 5 is a perspective schematic of an embodiment of the exterior locking device and an interior locking device mounted to a door.

FIG. 2 is a perspective view of the electronic locking device according to some embodiments. In the illustrated embodiment, the locking device 10 includes a handle 121. The handle 121 may be connected to a latch 501 (see FIG. 5) that maintains a door in a closed position until a person operates the handle 121 to retract the latch. The locking device 10 may be programmed such that the latch remains in a locked state until a user presents an authorized credential. Once a user has presented an authorized credential, the light ring 111 may emit an "access allowed" pattern of light notification and the electronic locking device 10 may allow the handle 121 to retract the latch so that the door can be opened. In one embodiment, this is accomplished by the controller causing a blocking pin (not shown) to unblock the handle, allowing the handle to be manually turned.

In some embodiments, the electronic locking device 10 may include or otherwise send a signal to an actuator configured to unlock or open an entrance or doorway (i.e., latch, deadbolt, garage door opener, etc.). Such an actuator may include a motor and suitable linkage and/or gear assembly or may include in addition or instead an electromagnet arranged to move the latch, the deadbolt, etc. In one embodiment, the actuator is disposed in the housing of the electronic locking device.

In accordance with some embodiments, the electronic locking device 10 includes a mechanical key override to allow the lock to be locked/unlocked without the use of an electronic or biometric credential. Accordingly, in the embodiment shown, a key cylinder 122 with a key slot 123 is provided. An opening 124 in the handle 121 allows access to the key cylinder. Inserting and turning a mechanical key in the key slot 123 may override the electronic locking device status and cancel any ongoing state of the lock (e.g., a latch in a locked state).

Figure 3:
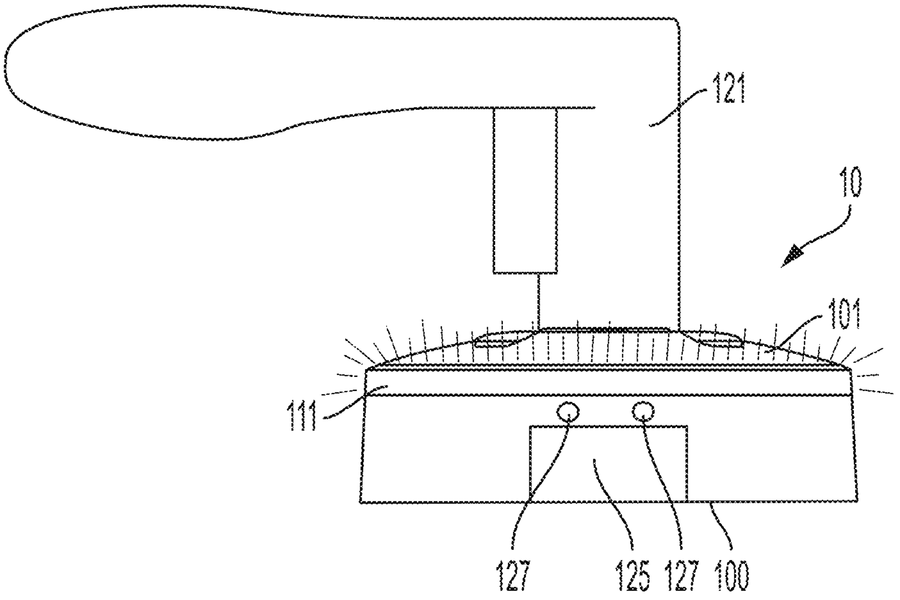
FIG. 3 is a bottom view of one embodiment of the electronic locking device.

FIG. 3 is a bottom view of the electronic locking device 10 in accordance with some embodiments. In the illustrated embodiment, the escutcheon 101 includes auxiliary electrical contacts 127 to allow backup power to the locking device in the event the battery power becomes too low. In this way, a user can press a 9-volt battery against the contacts 127 to provide auxiliary power to the device. As such, even if the electronic locking device completely loses power, a person can use the backup power method via the contacts 127 to enter an access code and receive a status event.

In some embodiments, the electronic locking device 10 may include a sound device 125 such as a speaker or a buzzer. The sound device 125 may be configured to play a sound in response to a status event. For example, the buzzer may play a "happy" sound when access is allowed, a "sad" sound when access is rejected, or an alert when the lock has low battery or the door is left ajar. The sound device 125 may coordinate with the light ring 111 to play a sound when the light ring displays a pattern of light in response to a status event.

Figure 4:
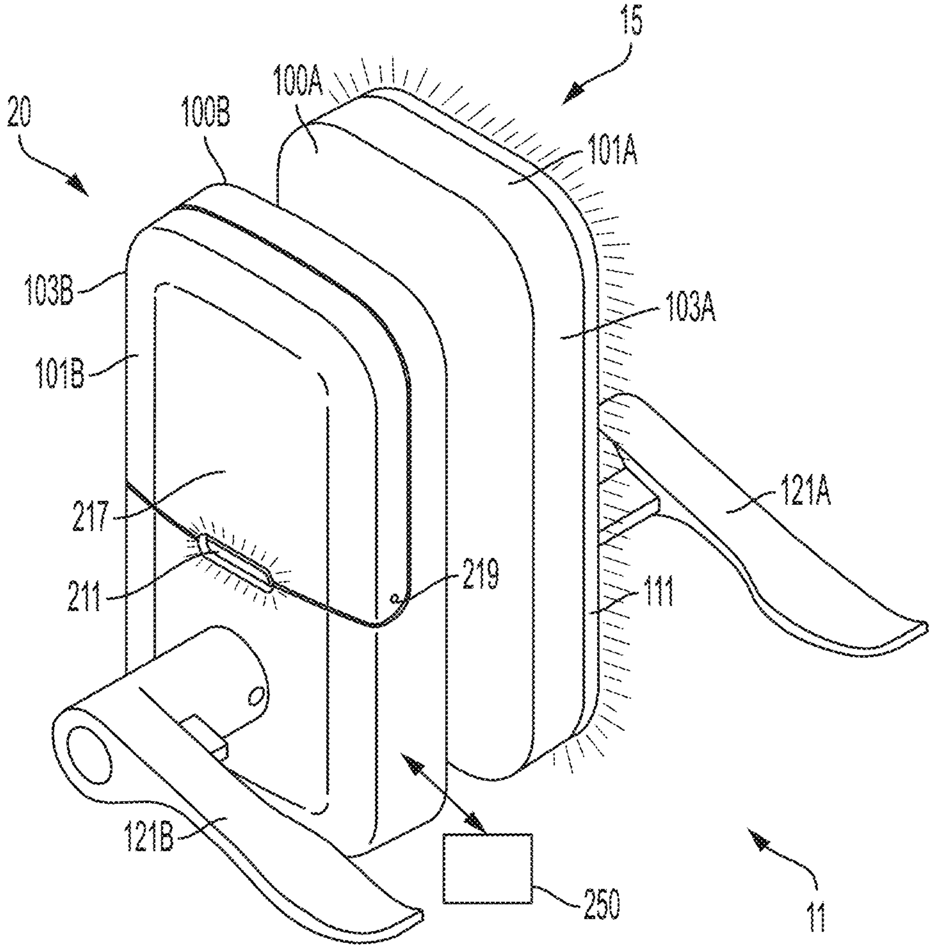
FIG. 4 is a perspective view of one embodiment of an exterior locking device and an interior locking device of an electronic lock set.

FIG. 4 shows a perspective view of an electronic lock set 11 according to some embodiments. The electronic lock set 11 may comprise an exterior locking device 15 and an interior locking device 20 configured to communicate with each other. In some embodiments, the exterior locking device 15 may be located exterior to a doorway and the interior locking device may be located interior to a doorway. In the depicted embodiment, the lock set cooperates with a latch 501 (see FIG. 5). In other embodiments, as described above, the electronic lock set 11 cooperates with a deadbolt.

The exterior locking device 15 and the interior locking device 20 may each comprise a light assembly that emits a complementary pattern of light in response to a status event. As such, anyone in view of the exterior locking device 15 or the interior locking device 20 may view the pattern of light and receive the status event notification. The complementary light patterns may be, for example, a single line horizontal or a vertical flashing light, a color (e.g., the same color), timing (e.g., synchronous, whether static or animated), intensity, and/or alternating colors.

In some embodiments, the exterior locking device 15 may be the same device as the electronic locking device 10 described above in FIGS. 1-3. The exterior locking device 15 may include a housing 100A and an exterior escutcheon 101A attached to the housing 100A. The escutcheon 100A may include a light ring 111 disposed on the body 103A of the escutcheon. The light ring 111 may be configured to emit a pattern of light in response to a status event. The pattern of light may be static or animated and may vary in intensity.

In some embodiments, the interior locking device 20 includes a housing 100B and an interior escutcheon 101B attached to the housing 100B. The escutcheon 101B may include a body 103B and a light pad 211 positioned on the body 103B. The light pad 211 may include one or more multi-color light emitting diodes that can emit a pattern of light in response to a status event. The light pad 211 may emit a pattern of light that is complementary to the pattern of light emitted by the light ring 111 in response to the same status event.

In some embodiments, the interior locking device 20 may include a battery cover 217 and a slot 219 to remove the battery cover 217. The electronic lock set may be battery powered or hard-wired to an electrical source.

In the illustrated embodiment, the electronic lock set 11 may include a handle and latch lock configuration. The exterior locking device 15 may include a handle 121A and the interior locking device 20 may include a handle 121B. The exterior locking device 15 and the interior locking device 20 may be mounted on opposite sides of an entry door 500, as illustrated in the embodiment in FIG. 5. An authorized credential may cause the electronic lock set to send a signal to unlock the latch lock (not shown) and allow handle 121A to be retracted to open the door, as described above.

Figure 6:
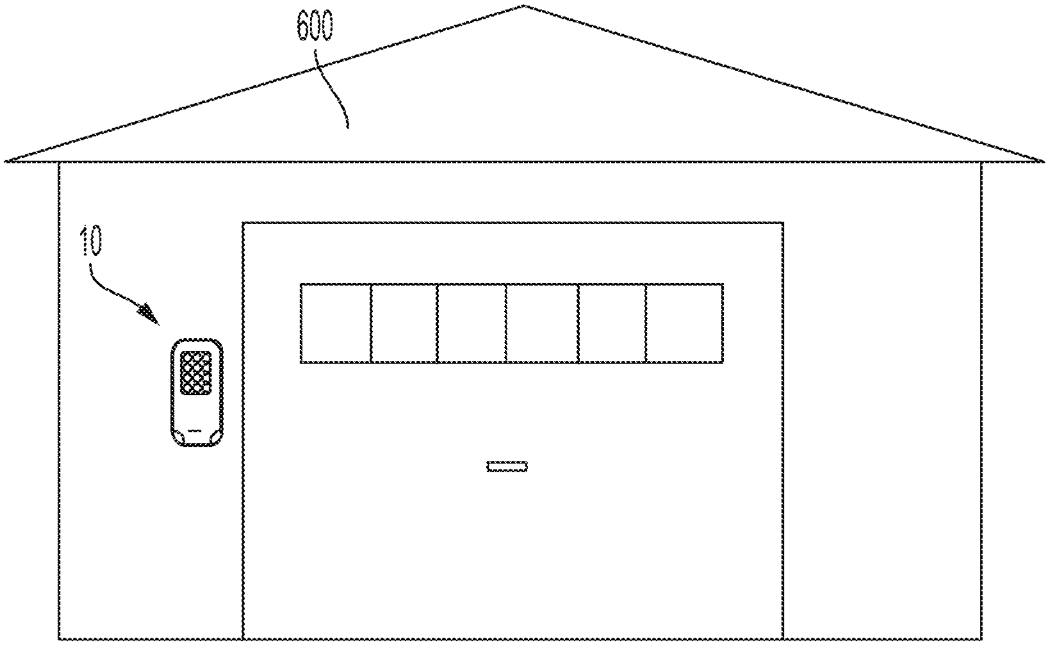
FIG. 6 is a front schematic of another embodiment of the exterior locking device mounted to a garage.

In some embodiments, the electronic lock set 11 may not include a handle or other opening device and rather may send a signal to a separate opening device (e.g., deadbolt, garage door opener). As illustrated in FIG. 6, the exterior locking device 10 may be mounted near a garage door. The interior locking device 20 may be mounted to an interior region of the garage, or alternatively may be mounted in a separate location (e.g., inside a home) or may be transportable (e.g., an app on a smartphone).

In accordance with some embodiments, the electronic lock set 11 includes within the second locking device 20 a controller 250 (shown schematically in FIG. 4) that is configured to receive a mode change from a mode setting button. In the illustrated embodiment, the mode setting button may incorporate the light pad 211 on the interior escutcheon body 103B. The mode setting button may also be a separate button from the light pad 211. In some embodiments, a user may enable a mode setting, such as a privacy mode, by pressing the mode setting button for two seconds. When the controller receives the mode change from the mode setting button, the controller may cause the light ring 111 to emit a pattern of light in response to the mode change (i.e., privacy active).

The privacy mode setting and other status events will be further described with reference to FIGS. 7-19, which show examples of light patterns that the light ring 111 may emit in response to a status event. The status events and corresponding light patterns described below are examples only and are not to be construed as an exclusive or restrictive list. The light ring may illuminate many different patterns of light to represent various status events that are not shown or described here.

Figure 7:
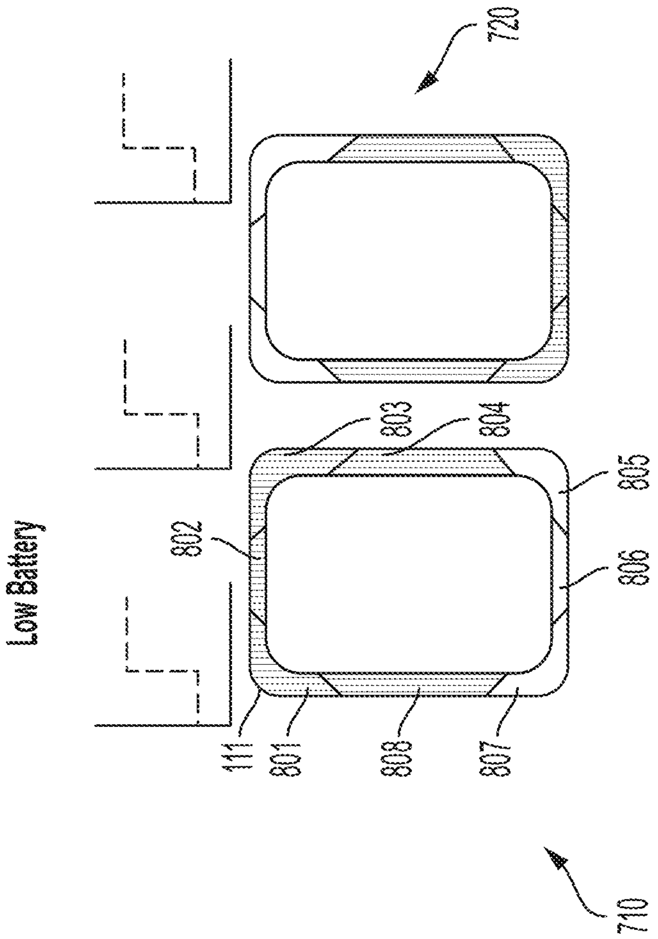
FIG. 7 is a schematic of a sample pattern of light emitted by a light ring in response to a "low battery" status event according to one embodiment.

As illustrated in the embodiment in FIG. 7, the light ring 111 may be divided into eight light sections (also referred to light segments) 801-808. The light sections may include four corner light sections (801, 803, 805, 807) and four straight light sections (802, 804, 806, 808). The light sections may independently emit light in various colors at different times to illuminate a unique light pattern from the light ring 111. The light patterns may be static or animated and may vary in intensity.

The pattern of light may be defined by a set of segments that repeat for a number of repetitions for a set duration of time. In a segment, each light section 801-808 may be programed to be on (i.e., the light section illuminates a defined color of light) or off. The light sections may also be programed to emit different colors (e.g., the corner light sections illuminating a red light and the straight sections illuminating a blue light). In some embodiments, the light pattern may involve one or more segments emitting a constant light (i.e., a static display) or the light pattern may have more than one segments emitting a changing light, whether on or off or one color and another color (i.e., an animated display). For example, the sections may turn on or off such that it appears that a light segment is rotating around the escutcheon. In another example, sections may turn on or off such that it appears that the upper and lower (or one side and the other side) are flipping, that is, the upper section is initially turned on and the lower section is turned off, then the upper section is turned off and the lower section is turned on. Further, the transitions within or among the sections may vary in intensity. For example, some transitions may appear to be turning the light sections on and off abruptly, such as a stepwise graph, transitioning directly from no light to intense light and vice versa (as illustrated in FIG. 7). Some transitions may appear to adjust the light intensity gradually, such as a slope graph, so that the light sections brighten and dim to off (as illustrated in FIG. 8).

FIG. 7 shows a sample light pattern that the light ring 111 may emit in response to a "low battery" status event. As the battery loses power, the electronic locking device may display several warnings (light and/or sound displays) before the lock powers down, which may cause the electronic lock to remain or transition into a locked (or unlocked) state. In this light pattern, there are two segments 810, 820. In the first segment 710, the top five light sections (801-804 and 808) of the light ring 111 are illuminated in a red light, whereas light sections 805, 806 and 807 of the light ring 111 remain unlit. In the second segment 720, the bottom five light sections (804-808) of the light ring 111 are illuminated in a red light, whereas light sections 801, 802 and 803 of the light ring 111 remain unlit. In one embodiment, the light pattern displays the two segments for six repetitions, each segment being displayed for a duration of 0.2 seconds, for a total light pattern duration of 2.4 seconds. The light sections may transition from on to off in a stepwise function. This creates an appearance that a red light is bouncing up and down on the light ring 111. The duration of each segment may be defined to vary the intensity. A corresponding sound (e.g., alert) may accompany the light pattern in response to the "low battery" status event. The light pad 211 on an interior locking device 20 may emit a complementary light pattern (e.g., flashing red light).

Figure 8:
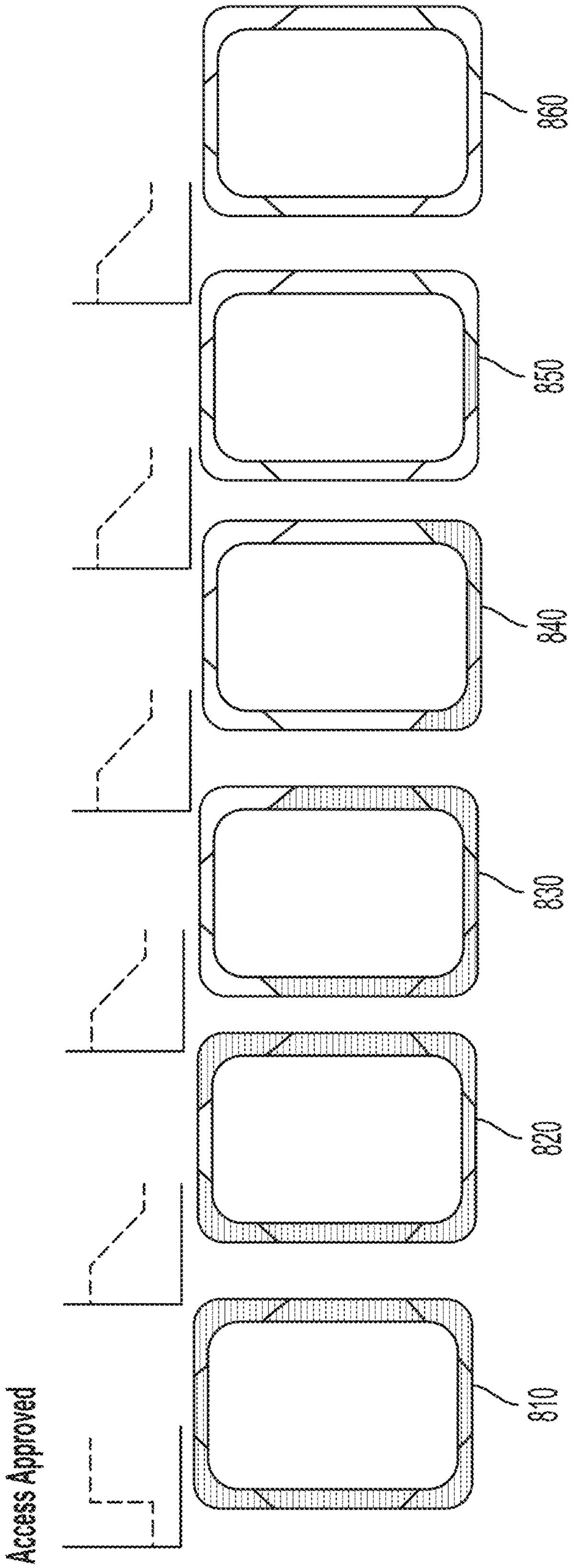
FIG. 8 is a schematic of a sample pattern of light emitted by the light ring in response to an "access approved" status event according to one embodiment.

FIG. 8 shows a sample light pattern that the light ring 111 may emit in response to an "access approved" status event, such as when a user presents an authorized credential to the electronic locking device and triggers an unlock command. In this pattern there are six segments, 810-860. In the first segment, all light sections of the light ring 111 are illuminated in a blue light. In each consecutive segment, the light sections, starting from the top of the light ring, begin to turn off until all of the light sections are unlit in the last segment 860. The light segments may appear to dim to off (i.e., a downward slope graph). This creates an appearance of cascading blue light on the light ring 111. In one embodiment, the light pattern displays the six segments for two repetitions, each segment being displayed for a duration of 0.2 seconds, for a total light pattern duration of 2.4 seconds. A corresponding "happy" sound may accompany the light pattern in response to the "access approved" status event. The light pad 211 on an interior locking device 20 may emit a complementary light pattern (e.g., cascading blue light).

Figure 9:
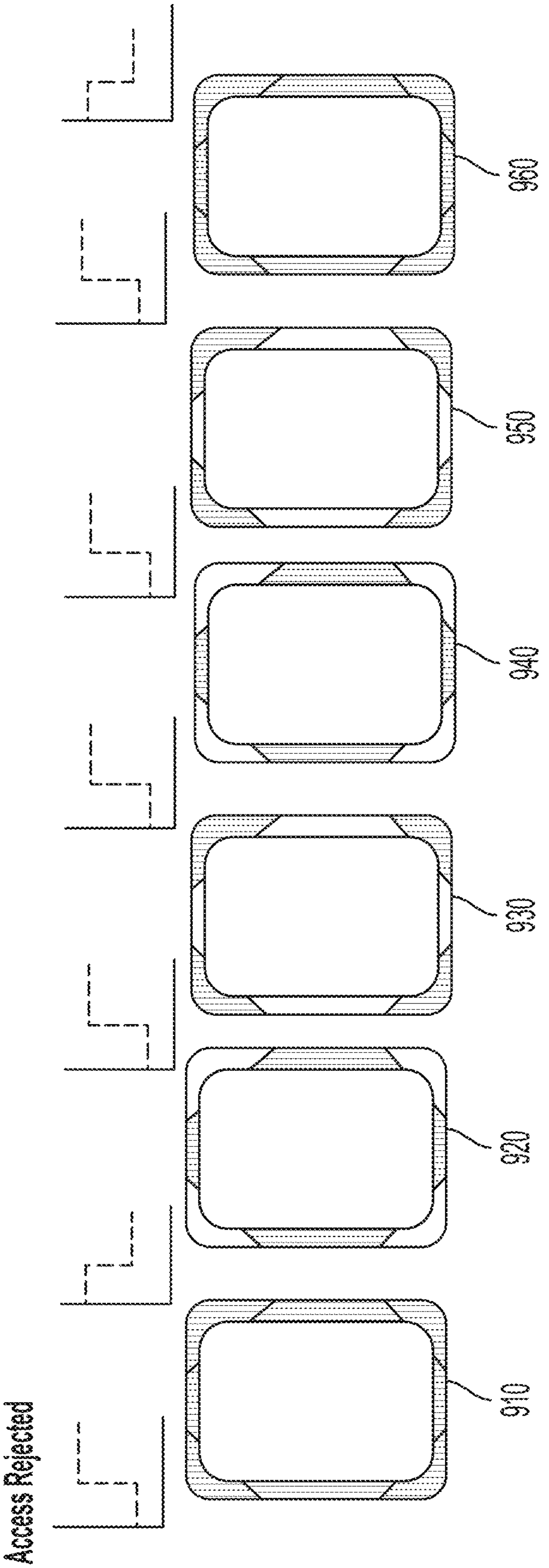
FIG. 9 is a schematic of a sample pattern of light emitted by the light ring in response to an "access rejected" status event according to one embodiment.

FIG. 9 shows a sample light pattern that the light ring 111 may emit in response to an "access rejected" status event, such as when a user presents an unauthorized credential to the electronic locking device. In this pattern there are six segments, 910-960. In the first segment 910 and the last segment 960, all of the light sections are illuminated in a red light. In segments 920 and 940, only the straight light sections are illuminated in a red light and in segments 930 and 950, only the corner light sections are illuminated in a red light. The light sections illuminate light on and off in a stepwise function, creating a flashing red light display. In one embodiment, the light pattern displays the six segments for two repetitions, each segment being displayed for a duration of 0.2 seconds, for a total light pattern duration of 2.4 seconds. A corresponding "sad" sound may accompany the light pattern in response to the "access rejected" status event. The light pad 211 on an interior locking device 20 may emit a complementary light pattern (e.g., flashing red light).

Figure 10:
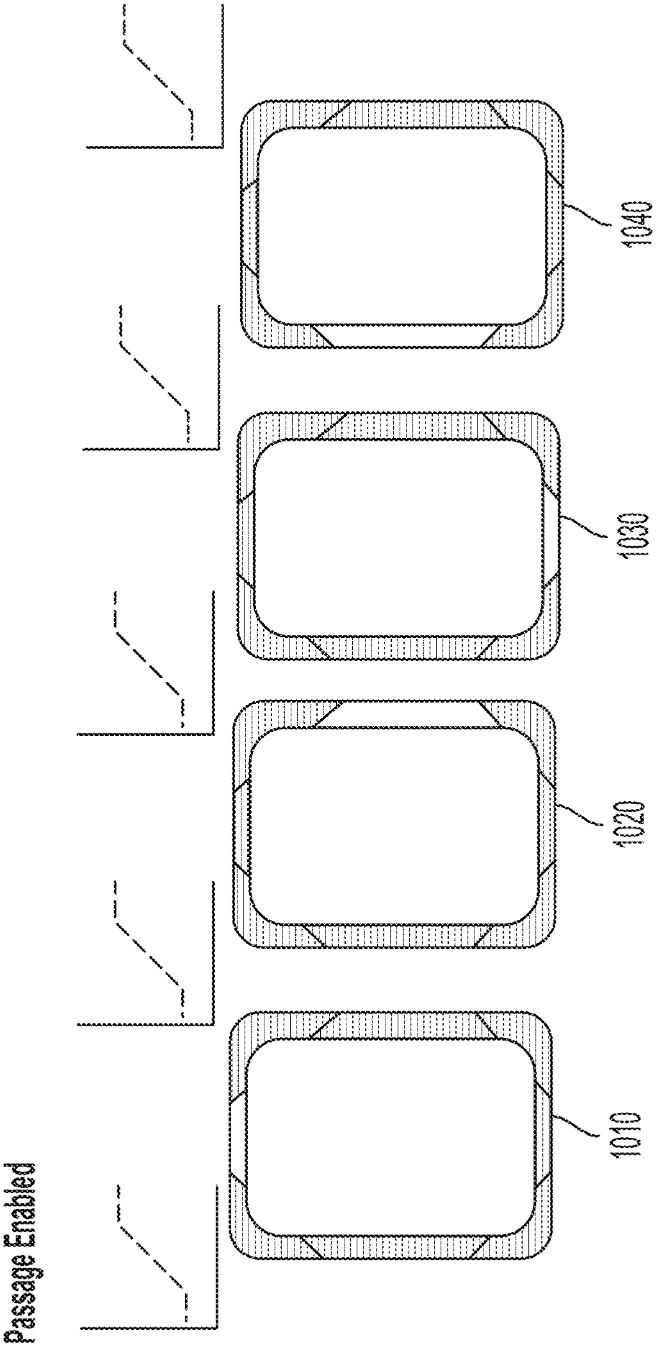
FIG. 10 is a schematic of a sample pattern of light emitted by the light ring in response to a "passage enabled" status event according to one embodiment.

FIG. 10 shows a sample light pattern that the light ring 111 may emit in response to a "passage enabled" status event. In some embodiments, the electronic locking device may be programmed in a passage mode setting which disables the default autolocking of a door latch lock. For example, in passage mode, the latch lock may remain unlocked so that a user may use a handle to retract the latch. In some embodiments, a user may enable the passage mode by opening the door, pressing the mode setting button on the interior locking device, and presenting an authorized credential. The light ring 111 may illuminate a pattern of light in response to the passage mode being enabled. In this pattern there are four segments, 1010-1040. In each segment, seven of the eight light sections of the light ring 111 are illuminated in a blue light. In the first segment 1010, the top straight light section is unlit; in the second segment 1020, the right straight light section is unlit; in the third segment, the bottom straight light section is unlit; and in the fourth segment, the left straight light section is unlit. The light sections may appear to gradually increase in intensity (i.e., an upward slope graph). In one embodiment, the light pattern displays the four segments for three repetitions, each segment being displayed for a duration of 0.2 seconds, for a total light pattern duration of 2.4 seconds. A corresponding "happy" sound may accompany the light pattern in response to the "access approved" status event. The light pad 211 on an interior locking device 20 may emit a complementary light pattern (e.g., blue light).

Figure 11:
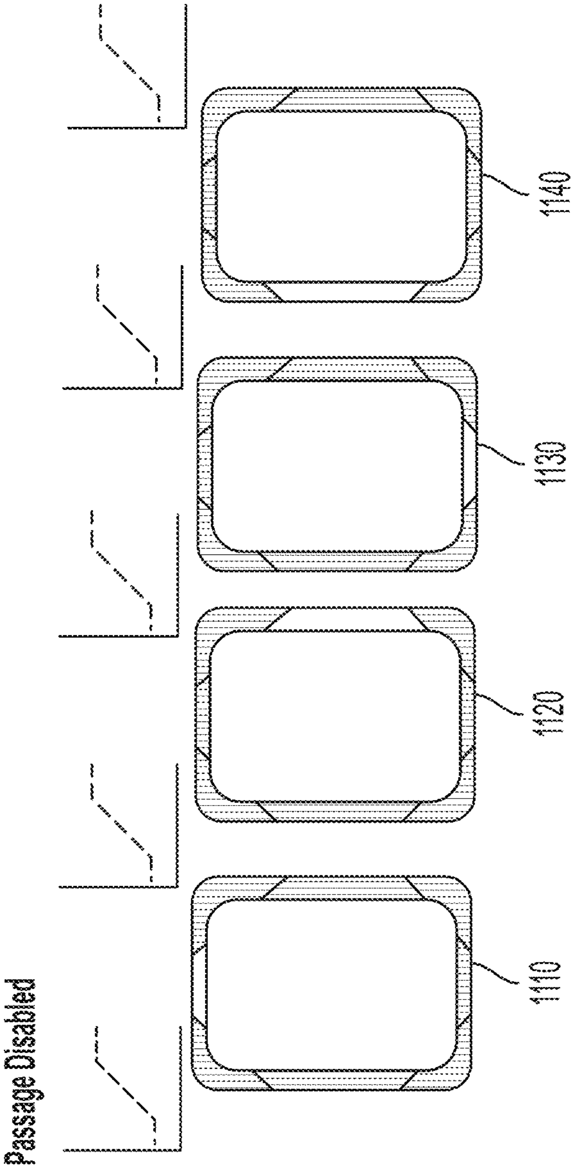
FIG. 11 is a schematic of a sample pattern of light emitted by the light ring in response to a "passage disabled" status event according to one embodiment.

FIG. 11 shows a sample light pattern in response to a "passage disabled" status event. A user may disable the passage mode by opening the door, pressing the mode setting button in the interior locking device, and presenting an authorized credential. The light ring 111 may illuminate a pattern of light in response to the passage mode being disabled. The pattern of light for the "passage disabled" status event may be the same pattern as the "passage enabled" status event described with reference to FIG. 10, with the light sections illuminating in a red light in each segment 1110-1140 rather than a blue light. The light pad 211 on an interior locking device 20 may emit a complementary light pattern (e.g., red light).

Figure 12:
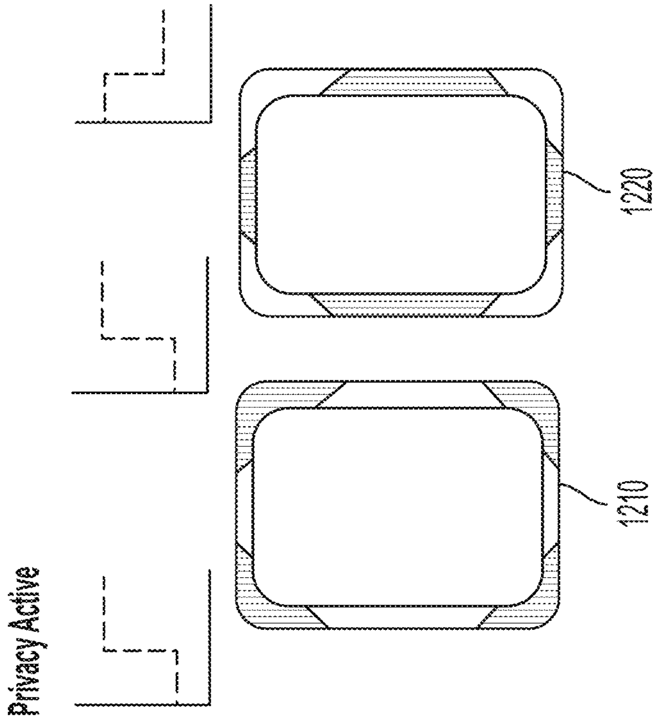
FIG. 12 is a schematic of a sample pattern of light emitted by the light ring in response to a "privacy active" status event according to one embodiment.

FIG. 12 shows a sample light pattern in response to a "privacy active" status event. In some embodiments, the electronic locking device may be programmed in a privacy mode setting which rejects access to authorized and unauthorized credentials. In some embodiments, a user may enable the privacy mode by pressing the mode setting button on the interior locking device for two seconds when the door is closed. The light ring 111 may illuminate a pattern of light in response to the privacy mode being enabled and in response to a user presenting an authorized credential when the privacy mode is enabled. The privacy enabled light pattern may include two segments 1210-1220. In the first segment 1210, only the corner light sections are illuminated in red. In the second segment 1220, only the straight light sections are illuminated in red. The light sections illuminate light on and off in a stepwise function, creating a flashing red light display. In one embodiment, the light pattern displays the two segments for six repetitions, each segment being displayed for a duration of 0.2 seconds, for a total light pattern duration of 2.4 seconds. A corresponding "happy" sound may accompany the light pattern in response to the "privacy enabled" status event. The light pad 211 on an interior locking device 20 may emit a complementary light pattern (e.g., flashing red light).

Figure 13:
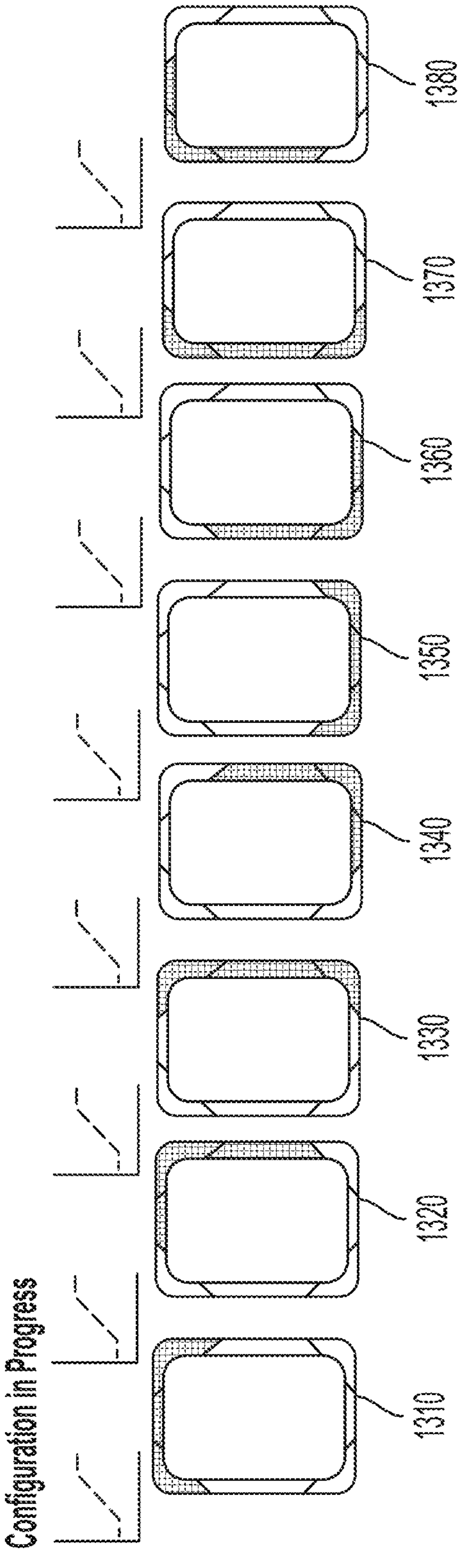
FIG. 13 is a schematic of a sample pattern of light emitted by the light ring in response to a "configuration in progress" status event according to one embodiment.

FIG. 13 shows a sample light pattern in response to a "configuration in progress" status event. In some embodiments, a user may configure settings of the electronic locking device (e.g., change light pattern colors and durations, enable mode settings, etc.) through a radio-frequency network using a mobile device. The light ring 111 may illuminate a pattern of light during the configuration process. The light pattern may include eight segments 1310-1380. In each segment, three consecutive light sections may be illuminated in a yellow light. For example, in segment 1310, the top three light sections may be illuminated, and the remaining light sections may be unlit. In each consecutive segment, the three illuminated light sections may shift one light section each in a clockwise direction, creating the effect of a yellow light travelling around the light ring 111. The light sections may appear to gradually increase in intensity (i.e., an upward slope graph). In one embodiment, the light pattern displays the eight segments for as many repetitions long as needed (i.e., until configuration is complete). The light pad 211 on an interior locking device 20 may emit a complementary light pattern (e.g., yellow light).

Figure 14:
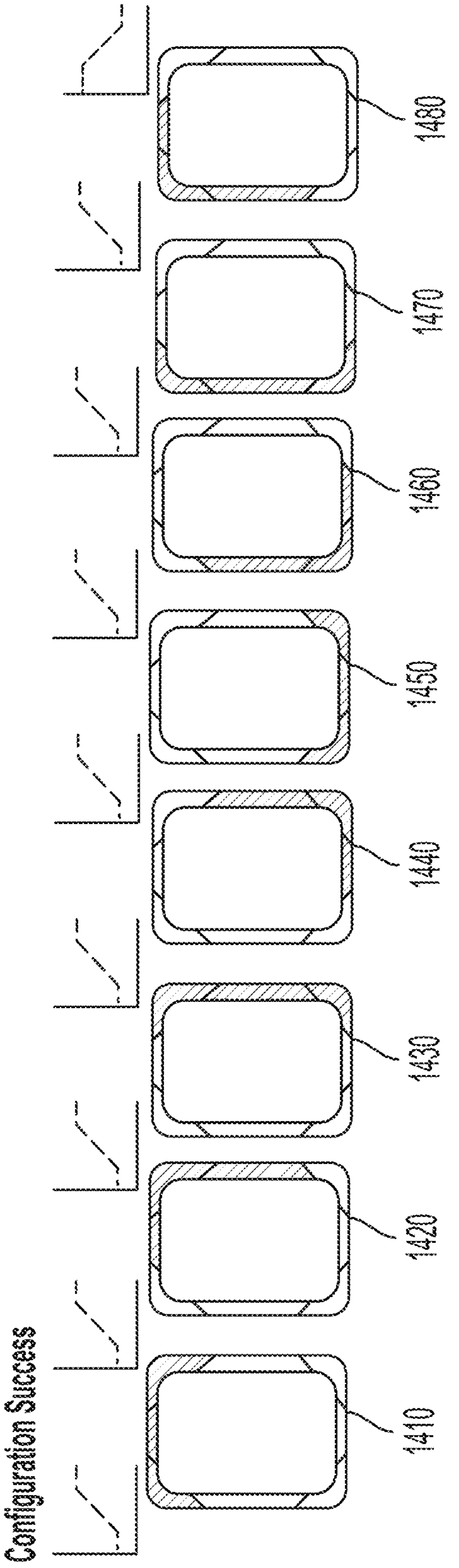
FIG. 14 is a schematic of a sample pattern of light emitted by the light ring in response to a "configuration success" status event according to one embodiment.

FIG. 14 shows a sample light pattern in response to a "configuration success" status event. The light pattern may include eight segments 1410-1480. The pattern of light for the "configuration success" status event may be the same pattern as the "configuration in progress" status event described with reference to FIG. 13, with the light sections illuminating in a green light in each segment 1410-1480 rather than a yellow light. In one embodiment, the light pattern displays the eight segments for one repetition, each segment being displayed for a duration of 0.2 seconds, for a total light pattern duration of 1.6 seconds. A corresponding "happy" sound may accompany the light pattern in response to the "configuration success" status event. The light pad 211 on an interior locking device 20 may emit a complementary light pattern (e.g., green light).

Figure 15:
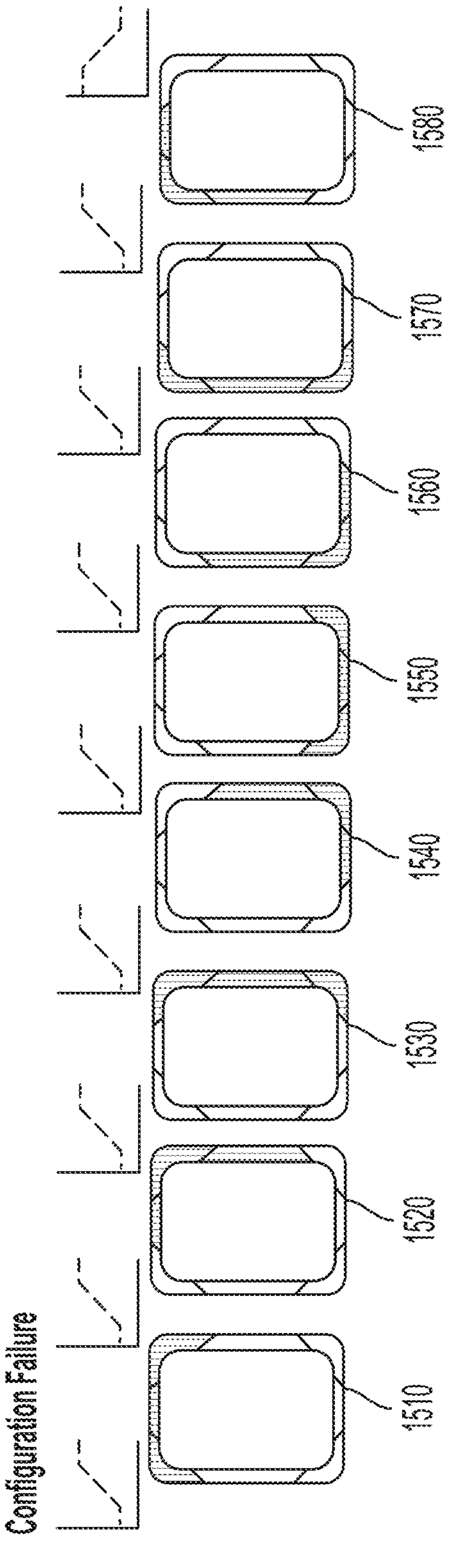
FIG. 15 is a schematic of a sample pattern of light emitted by the light ring in response to a "configuration failure" status event according to one embodiment.

FIG. 15 shows a sample light pattern in response to a "configuration failure" status event. The light pattern may include eight segments 1510-1580. The pattern of light for the "configuration failure" status event may be the same pattern as the "configuration in progress" status event described with reference to FIG. 13, with the light sections illuminating in a red light in each segment 1510-1580 rather than a yellow light. In one embodiment, the light pattern displays the eight segments for one repetition, each segment being displayed for a duration of 0.2 seconds, for a total light pattern duration of 1.6 seconds. A corresponding "sad" sound may accompany the light pattern in response to the "configuration failure" status event. The light pad 211 on an interior locking device 20 may emit a complementary light pattern (e.g., red light).

Figure 16:
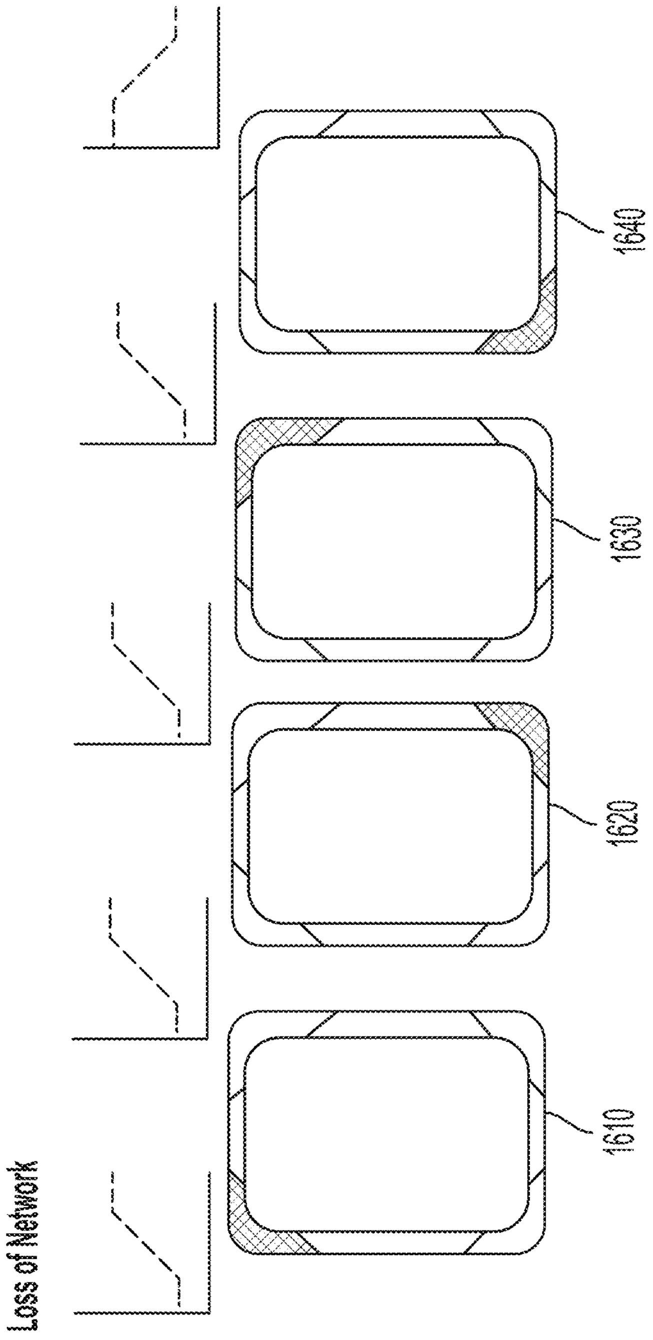
FIG. 16 is a schematic of a sample pattern of light emitted by the light ring in response to a "loss of network" status event according to one embodiment.

FIG. 16 shows a sample light pattern in response to a "loss of network" status event. In some embodiments, the light ring 111 may display a light pattern every five minutes when the electronic locking device cannot communicate to the central server. The light pattern may include four segments 1610-1640. In each segment, a different corner light section is illuminated in an orange light, creating the effect of an orange light jumping among the corners of the light ring 111. The light sections may appear to gradually increase in intensity (i.e., an upward slope graph). In one embodiment, the light pattern displays the four segments for three repetitions, each segment being displayed for a duration of 0.2 seconds, for a total light pattern duration of 2.4 seconds. A corresponding sound (e.g., an alert) may accompany the light pattern in response to the "loss of network" status event. The light pad 211 on an interior locking device 20 may emit a complementary light pattern (e.g., flashing orange light).

Figure 17:
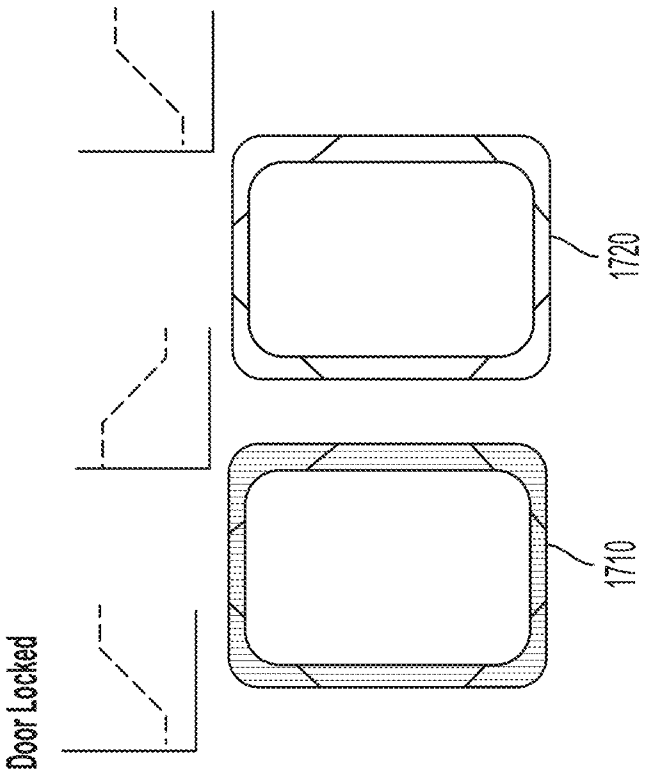
FIG. 17 is a schematic of a sample pattern of light emitted by the light ring in response to a "door locked" status event according to one embodiment.

FIG. 17 shows a sample light pattern in response to a "door locked" status event (e.g., upon automatic relocking of the device, the release of the passage mode, and the rejection of a credential). In some embodiments, the light pattern may include two segments 1710-1720. In the first segment 1710, all of the light sections are illuminated in a red light, and in the second segment 1720, all of the light sections are unlit. The light sections gradually increase and decrease in intensity (i.e. slope graph) between segments. In one embodiment, the light pattern displays the two segments for six repetitions, each segment being displayed for a duration of 0.2 seconds, for a total light pattern duration of 2.4 seconds. A corresponding sound (e.g., an alert) may accompany the light pattern in response to the "door locked" status event. The light pad 211 on an interior locking device 20 may emit a complementary light pattern (e.g., flashing red light).

Figure 18:
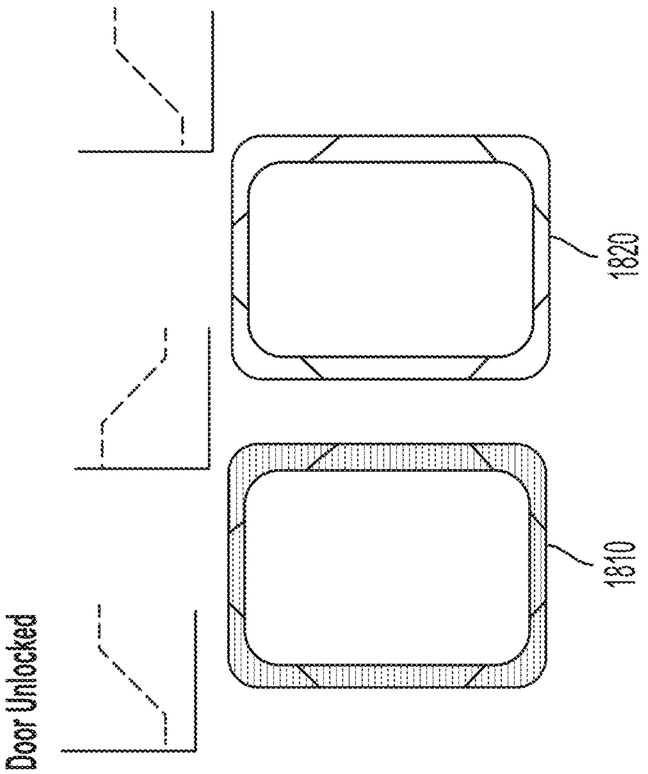
FIG. 18 is a schematic of a sample pattern of light emitted by the light ring in response to a "door unlocked" status event according to one embodiment.

FIG. 18 shows a sample light pattern in response to a "door unlocked" status event (e.g., upon presentation of an authorized credential). In some embodiments, the light pattern may include two segments 1810-1820. The pattern of light for the "door unlocked" status event may be the same pattern as the "door locked" status event described with reference to FIG. 17, with the light sections illuminating in a blue light in segment 1810 rather than a red light. In one embodiment, the light pattern displays the two segments for six repetitions, each segment being displayed for a duration of 0.2 seconds, for a total light pattern duration of 2.4 seconds. A corresponding "happy" sound may accompany the light pattern in response to the "door locked" status event. The light pad 211 on an interior locking device 20 may emit a complementary light pattern (e.g., blue light).

Figure 19:
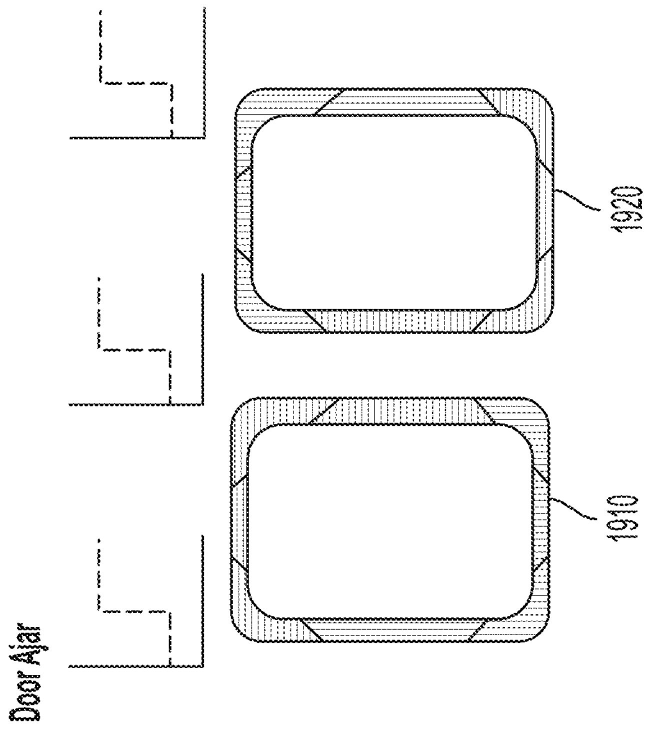
FIG. 19 is a schematic of a sample pattern of light emitted by the light ring in response to a "door ajar" status event according to one embodiment.

FIG. 19 shows a sample light pattern that the light ring 111 may emit in response to a "door ajar" status event. In some embodiments, if a door is left open for longer than 30 seconds, the electronic locking device may illuminate a light pattern every two minutes for five repetitions. In this light pattern, there are two segments 1910, 1920. In the first segment 1910, four consecutive light sections of the light ring 111, starting at the top left corner, are illuminated in a red light, and the remaining four consecutive light sections are illuminated in a blue light. In the second segment 1920, the light sections that were illuminated in a blue light in the first segment are now illuminated in a red light, and the light segments that were illuminated in a red light in the first segment are now illuminated in a blue light. The light sections may alternate between illuminating in a red and blue light in a stepwise function. This creates an appearance that the blue and red light are bouncing between opposite corners on the light ring 111. In one embodiment, the light pattern displays the two segments for six repetitions, each segment being displayed for a duration of 0.2 seconds, for a total light pattern duration of 2.4 seconds. A corresponding sound (e.g., alert) may accompany the light pattern in response to the "door ajar" status event. The light pad 211 on an interior locking device 20 may emit a complementary light pattern (e.g., flashing blue and flashing red light).

Table 1 summarizes sample light pattern parameters with respect to different status events.

TABLE 1

Example light pattern parameters

| Events V2 Full Animation | Number of Frames | Number of Repetitions | Segment Duration | LED Total Duration | Sound |
|---|---|---|---|---|---|
| Low Battery | 2 | 6 | 0.2 | 2.4 | Alert |
| Access Approved | 6 | 2 | 0.2 | 2.4 | Happy |
| Access Rejected | 6 | 2 | 0.2 | 2.4 | Sad |

TABLE 1-continued

Example light pattern parameters

| Events V2 Full Animation | Number of Frames | Number of Repetitions | Segment Duration | LED Total Duration | Sound |
|---|---|---|---|---|---|
| Passage Enabled | 4 | 3 | 0.2 | 2.4 | Happy |
| Privacy Active | 2 | 6 | 0.2 | 2.4 | Happy |
| Configuration in progress | 8 | as long as needed | 0.2 | TBD | no sound |
| Configuration Success | 8 | 1 | 0.2 | 1.6 | Happy |
| Configuration Failure | 8 | 1 | 0.1 | 0.8 | Sad |
| Loss of Network | 4 | 3 | 0.2 | 2.4 | Alert |
| Door Locked | 2 | 6 | 0.2 | 2.4 | Alert |
| Door Unlocked | 2 | 6 | 0.2 | 2.4 | Happy |
| Door Ajar | 2 | 6 | 0.2 | 2.4 | Alert |

In some embodiments, the parameters may automatically change to "battery saver" parameters when the battery power reaches a certain lower threshold. Table 2 summarizes sample "battery saver" light pattern parameters with respect to different status events. In some embodiments, the parameters in Table 1 and Table 2 may be the default parameters of the locking device. A user may change the light pattern by altering any of the parameters.

TABLE 2

Example "battery saver" light pattern parameters

| Events V2 Battery Saver Animation | Number of Segments | Number of Repetitions | Segment Duration | Total Duration | Sound |
|---|---|---|---|---|---|
| Low Battery | 2 | 3 | 0.2 | 1.2 | Alert |
| Access Approved | 6 | 1 | 0.2 | 1.2 | Happy |
| Access Rejected | 6 | 1 | 0.2 | 1.2 | Sad |
| Passage Enabled | 4 | 1 | 0.2 | 0.8 | Happy |
| Privacy Active | 2 | 3 | 0.2 | 1.2 | Happy |
| Configuration in progress | 8 | as long as needed | 0.2 | TBD | no sound |
| Configuration Success | 8 | 1 | 0.2 | 1.6 | Happy |
| Configuration Failure | 8 | 1 | 0.2 | 1.6 | Sad |
| Loss of Network | 4 | 3 | 0.2 | 2.4 | Alert |
| Door Locked | 2 | 2 | 0.2 | 0.8 | Alert |
| Door Unlocked | 2 | 2 | 0.2 | 0.8 | Happy |
| Door Ajar | 2 | 3 | 0.2 | 1.2 | Alert |

It should be appreciated that although illustrative embodiments of various light patterns have been shown and described, the present disclosure is not limited in this respect, and one light pattern shown for its corresponding status may be employed for a different status. Further, it is contemplated that other light patterns may be employed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An electronic locking device configured to be mounted to a surface, the electronic locking device comprising:
- a housing; and
- an escutcheon attached to the housing, the escutcheon having a body, wherein the body includes a front face opposite a mounting surface of the electronic locking device and at least one sidewall, wherein the mounting surface is configured to contact the surface when the electronic locking device is mounted to the surface, wherein a light ring extends from a perimeter of the front face to an adjacent perimeter of the at least one sidewall, the light ring configured to emit a changeable pattern of light in response to a status event to indicate a status of the electronic locking device, wherein the light ring is viewable from a front view and a side profile view perpendicular to the front view,
- wherein the light ring forms at least a partial surface of the front face and at least a partial surface of the at least one sidewall, and
- the light ring is flush with the front face and the at least one sidewall.

2. The electronic locking device of claim 1, further comprising a handle positioned on the housing.

3. The electronic locking device of claim 1, further comprising a mechanical key override comprising a key cylinder, wherein the electronic locking device is configured to cancel the status upon actuation of the mechanical key override.

4. The electronic locking device of claim 1, wherein the light ring comprises at least two light sections configured to emit light independently from each other.

5. The electronic locking device of claim 4, wherein each light section is configured to emit at least two colors of light.

6. The electronic locking device of claim 1, further comprising a sound device configured to emit a sound in response to the status event.

7. An electronic lock set comprising:
- an exterior locking device configured to be mounted to an exterior surface of an entrance, the exterior locking device comprising:
  - an exterior housing;
  - an exterior escutcheon attached to the exterior housing, the exterior escutcheon having a body, wherein the body includes a front face opposite a mounting surface of the exterior locking device and at least one sidewall, wherein the mounting surface is configured to contact the exterior surface when the exterior locking device is mounted to the exterior surface; and
  - a light ring that extends from a perimeter of the front face to an adjacent perimeter of the at least one sidewall;
- an interior locking device having an interior housing, an interior escutcheon attached to the interior housing, and a mode setting button, the interior locking device configured to be mounted to an interior surface of the entrance; and
- a controller cooperating with the exterior and interior locking devices, the controller configured to receive a mode change from the mode setting button and configured to cause the light ring to illuminate a corresponding mode indication based on the mode change.

8. The electronic lock set of claim 7, wherein the controller is configured to receive a privacy mode setting and wherein the controller is configured to cause the light ring to illuminate a privacy mode indication when an authorized electronic credential is presented to the exterior locking device.

9. The electronic lock set of claim 8, wherein the exterior locking device further comprising a mechanical key override comprising a key cylinder, wherein the exterior locking device is configured to cancel the privacy mode setting upon actuation of the mechanical key override.

10. The electronic lock set of claim 7, wherein the interior locking device further comprises a light pad disposed on the interior escutcheon, wherein the controller is configured to cause the light pad to illuminate a corresponding mode indication based on the mode change.

11. The electronic lock set of claim 10, wherein the light pad comprises the mode setting button.

12. The electronic lock set of claim 8, wherein the controller is configured to cause the light ring to illuminate an unauthorized credential indication when an unauthorized electronic credential is presented to the exterior locking device, wherein the unauthorized credential indication is different from the privacy mode indication.

13. The electronic lock set of claim 7, wherein illuminating a corresponding mode indication based on the mode change comprises emitting a color and/or pattern of light from the light ring associated with a selected mode.

14. The electronic lock set of claim 7, wherein the light ring comprises a rounded rectangular shape.

* * * * *